United States Patent [19]

Ribi

[11] 4,379,567
[45] Apr. 12, 1983

[54] FRONT SUSPENSION SYSTEM FOR A MOTORCYCLE

[75] Inventor: Valentino Ribi, Genoa, Italy

[73] Assignee: Honda Giken Kogyo Kabushiki Kaisha, Asaka, Japan

[21] Appl. No.: 208,373

[22] Filed: Nov. 19, 1980

[30] Foreign Application Priority Data

Nov. 22, 1979 [IT] Italy ............................... 12835 A/79

[51] Int. Cl.³ ............................................ B62K 21/02
[52] U.S. Cl. .................................... 280/276; 280/279
[58] Field of Search ............... 280/276, 277, 279, 281, 280/283, 16, 21 R

[56] References Cited

U.S. PATENT DOCUMENTS 3,870,329  3/1975  Evequoz ................................ 280/16
4,212,481  7/1980  Ribi ..................................... 280/277

Primary Examiner—David M. Mitchell
Assistant Examiner—John A. Carroll
Attorney, Agent, or Firm—Pollock, Vande Sande & Priddy

[57] ABSTRACT

A front suspension system for a motorcycle wheel, comprising a downwardly and forwardly inclined suspension structure mounted on the steering column, two swinging arms both disposed substantially parallel to the plane of the motorcycle wheel and pivoted at one end to the suspension structure and at the other end to a wheel-carrying element, so that the suspension structure, the two swinging arms and the wheel-carrying element form an articulated quadrilateral, a shock absorber acting on the articulated quadrilateral to oppose relative movement between the suspension structure and the wheel-carrying element, due to a load applied to the motorcycle.

11 Claims, 2 Drawing Figures

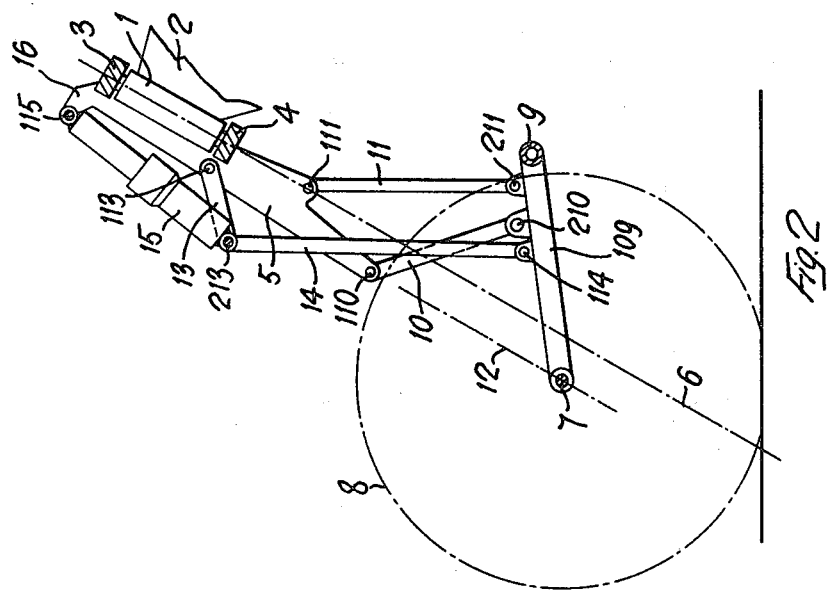
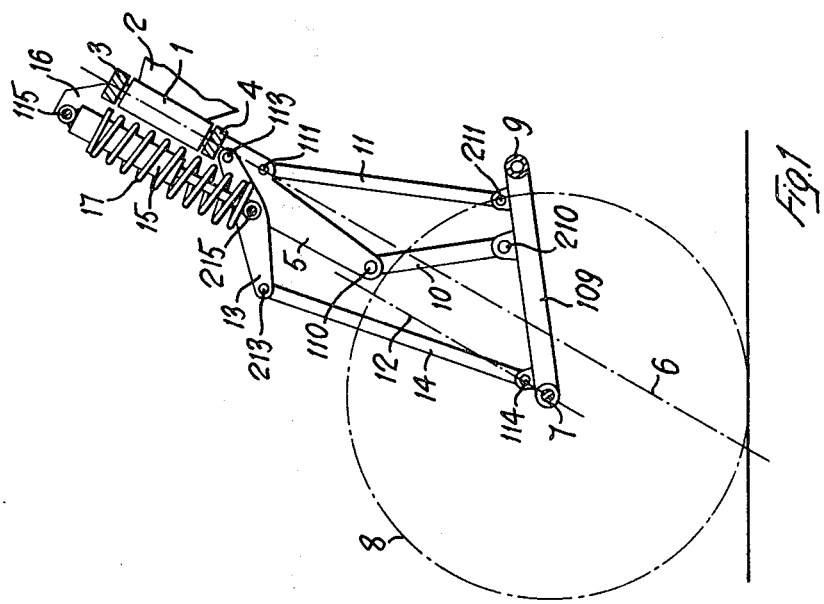

FRONT SUSPENSION SYSTEM FOR A MOTORCYCLE

The present invention relates to a front suspension system for a motorcycle wheel, comprising a downwardly and forwardly inclined suspension structure mounted on the steering column, two swinging arms both disposed substantially parallel to the plane of the motorcycle wheel and pivoted at one end to the suspension structure and at the other end to a wheel-carrying element, so that the suspension structure, the two swinging arms and the wheel-carrying element form an articulated quadrilateral, resilient and/or shock absorber means acting on the articulated quadrilateral to oppose relative movement between the suspension structure and the wheel-carrying element, due to a load applied to the motorcycle.

The object of the present invention is to provide a front suspension system of the aforementioned kind and presenting the following advantages:

Reduced weight of the suspension system;

The use of only one resilient and/or shock absorber means in place of two identical resilient and/or shock absorber means;

Greater rigidity in the plane perpendicular to the wheel axle;

Smaller overall dimensions;

Reduced inertia with respect to the steering axis (axis of the steering column);

Better protection for the resilient and/or shock absorber means.

The front wheel suspension system according to the invention is characterized in that the wheel-carrying element has a prolongation which is parallel to the plane of the motorcycle wheel and extends forward beyond the two connection points between the two swinging arms and the wheel-carrying element, with the motorcycle wheel mounted on the said prolongation, the articulated quadrilateral being located at the rear of the suspension structure, and the resilient and/or shock absorber means being mounted in front of the suspension structure and being connected either to one of the two swinging arms or to the wheel-carrying element, through at least one connecting rod.

BRIEF DESCRIPTION OF THE DRAWING

These and other characteristic features of the invention and the advantages deriving therefrom will appear evident from the following specification of which discloses two embodiments thereof, with reference to the accompanying drawings showing these embodiments in side elevation and median vertical section in FIGS. 1 and 2.

DESCRIPTION OF THE PREFERRED EMBODIMENTS

In both of the shown embodiments, 1 denotes the steering column which is integral with the motorcycle body 2. Rotatably mounted inside column 1 is the steering pin with which (through an upper cross member 3 and a lower cross member 4) is integral the suspension structure 5 consisting of two arms arranged in a parallel and transversely spaced apart relation, and extending in a downward direction, substantially parallel to the axis 6 of the steering column 1.

The axle 7 of wheel 8 is mounted in the open forward end of a lower fork 9, placed in position, a position which is horizontal or slightly inclined with respect to the horizontal.

Between each of the two arms 109 of the lower fork 9 and the corresponding arm of the suspension structure 5, there is interposed an articulated suspension system comprising two swinging arms 10 and 11 arranged in non-parallel relation, e.g., converging towards arm 109 of fork 9, and having their upper ends pivoted at 110 and 111 to the respective arm of the suspension structure 5, and their lower ends pivoted at 210 and 211 to the respective arm 109 of fork 9, in a rearward direction with respect to the wheel axle 7.

The two swinging arms 10, 11 form with the respective arm of the suspension structure 5 and with the respective arm 109 of the lower fork 9 an articulated quadrilateral preferably having a geometry such that the axle 7 of wheel 8 is located forward of before the axis 6 of the steering column 1 and moves along an excursion path of a shape corresponding to the specific requirements of a particular case, particularly along an excursion path 12 which is rectilinear or substantially rectilinear, and possibly also parallel or substantially parallel to the axis 6 of the steering column 1, for the purpose, e.g., of keeping the forerun constant or substantially constant over the whole excursion of the wheel.

Each one of the lateral articulated systems furthermore comprises a swinging lever 13 having one end fulcrumed as at 113 onto the respective arm of the suspension structure 5, or onto the lower cross member 4, and its other end 213 hingedly connected to a downwardly extending connecting rod 14 which is pivoted at 114 to the respective arm 109 of the lower fork 9.

The front suspension system comprises also one single shock absorber 15 located approximately at the same level as the steering column 1, in an intermediate position between the two arms of the suspension structure 5 and between the two identical, lateral, articulated systems 10, 11, 13, 14, 109, which are associated to the said arms. In both of the embodiments according to FIGS. 1 and 2, the shock absorber 15 has its upper end pivoted at 115 to the upper ends of the two arms of the suspension structure 5, or to two corresponding, transversely spaced apart upper wings 16, which are integral with the upper cross member 3.

In the embodiment according to FIG. 1, the lower end of shock absorber 15 is pivoted at an intermediate point 215 of the swinging lever 13, between the fulcrum 113 of this lever and the pivotal connection 213 for the connecting rod 14. Moreover, the point of the pivotal connection 114 of the connecting rod 14 to the respective arm 109 of fork 9 is located in proximity of axle 7 and wheel 8. The geometry of the whole articulated system, together with the shock absorber 15, is so selected that the ratio between the excursion of the wheel axle 7 and the related excursion of shock absorber 15 corresponds (for values between 3 and 1.5) to a curve that decreases in the direction of the shock absorber compression. The shock absorber 15 is associated to an outer helical spring 17, which is adapted for the type of progressiveness of the system.

Besides the already disclosed general advantages of the invention, the embodiment according to FIG. 1 affords the further advantage of enhanced simplicity, since during the excursion of the wheel, there is no overlapping whatever of the elements 5, 10, 11, and 14 of each articulated suspension system. Moreover, this embodiment is more adapted for associated with helical spring 17.

In the embodiment according to FIG. 2, the lower end of shock absorber 15 is pivoted to the swinging lever 13 in the same point 213 of pivotal connection as the connecting rod 14. Furthermore, the point 114 for pivotal connection of the connecting rod 14 to the respective arm 109 of fork 9 is located at some distance from the axle 7 of wheel 8 and is located either in an intermediate position between the axle 7 of wheel 8 and the pivotal connection 210 of suspension arm 10, or—as shown—in proximity of the said pivotal connection 210. Also in this case, the geometry of the whole articulated system is preferably selected so as to achieve the required progressiveness, with a decreasing curve of the ratio between the excursion of the wheel axle 7 and the corresponding excursion of shock absorber 15. Springs (not shown) may be added as desired.

The embodiment according to FIG. 2 is more complex than that of FIG. 1, since the connecting rod 14 is in an overlapping relation with elements 5 and 10 of the respective articulated system. The embodiment according to FIG. 2, however, assures greater protection for the connecting rod 14, and reduces the load on the arms of the supporting structure 5, since the connecting rod 14 operates in an almost vertical position, i.e., in a position substantially parallel to the load of wheel 8.

The FIG. 1 mode of pivotally connecting, according to FIG. 1, the shock absorber 15 and the connecting rod 14 to the swinging lever 13 may be combined with the FIG. 2 mode of pivotally connecting the connecting rod 14 to the respective arm 109 of the lower fork 9, and vice versa.

I claim:

1. A front suspension wheel system for a motorcycle wheel, comprising
   (a) a downwardly and forwardly inclined suspension structure mounted on the steering column;
   (b) two swinging arms pivoted at one end to said suspension structure and at the other end to a wheel-carrying element so that said suspension structure, said two swinging arms and said wheel-carrying element form an articulated quadrilateral;
   (c) resilient means acting on said articulated quadrilateral to oppose relative movement between said suspension structure and said wheel-carrying element due to a load applied to the motorcycle;
   (d) a swinging lever having one part fulcrumed to said suspension structure, and another part connected to said resilient means and to a downwardly extending connecting rod;
   (e) a prolongation on said wheel-carrying element extending forwardly beyond the pivot points between said two swinging arms and said wheel-carrying element, and adapted for mounting a motorcycle wheel;
   (f) said articulated quadrilateral being located rearwardly of said suspension structure and said resilient means being mounted on a forward portion of said suspension structure and being connected to one of (1) said two swinging arms and (2) said wheel-carrying element, through said connecting rod.

2. A front suspension system according to claim 1, wherein said suspension structure comprises a pair of parallel arms transversely spaced from one another and substantially parallel to the axis of said steering column, said wheel-carrying element being bifurcated, two swinging arms and at least one connecting rod being associated with each arm of said suspension and with the corresponding arm of said bifurcated wheel-carrying element, whereby two articulated quadrilaterals are formed.

3. A front suspension system according to claim 1 or 2, wherein said resilient means are located at the front of said steering column.

4. A front suspension system according to claim 1 or 2, wherein the upper end of said resilient means is pivotally connected to said suspension structure, and the lower end of said resilient means is operatively connected to a swinging lever fulcrumed at one end on the respective arm of said suspension structure and pivotally connected at the other end with the corresponding connecting rod.

5. A front suspension system according to claim 1 or 2, wherein the lower end of said resilient means and the corresponding connecting rod are operatively connected to one end of a swinging lever, said lever being fulcrumed by its other end on the respective arm of the suspension structure.

6. A front suspension system according to claim 1 or 2, wherein the lower end of said connecting rod is pivoted to said wheel-carrying element adjacent to the point of said pivotal connection between the forwardly located swinging arm and said wheel-carrying element.

7. A front suspension system according to claim 1 or 2, wherein the lower end of said connecting rod is pivotally connected to said wheel-carrying element adjacent to said wheel axle.

8. A front suspension system according to claim 1 or 2, wherein the lower end of said connecting rod is pivoted to said wheel-carrying element at a position between said wheel axle and the pivotal connection of the forwardly located swinging arm to said wheel-carrying element.

9. A front suspension system according to claim 1 or 2, wherein the geometry of said articulated quadrilateral is such that the excursion path of the wheel axle is substantially rectilinear and substantially parallel to the steering column axis.

10. A front suspension system according to claim 9, wherein the excursion path of said wheel axle is substantially parallel to the longitudinal direction of the arms of the suspension structure.

11. A front suspension system according to claim 1 or 2, wherein the geometry of said articulated quadrilateral is such that the ratio between the excursion path of the wheel axle and the excursion of the related resilient means corresponds to a curve that decreases in the direction of compression of said resilient means.

* * * * *